United States Patent
Bandyopadhyay et al.

(10) Patent No.: US 12,363,098 B2
(45) Date of Patent: Jul. 15, 2025

(54) SELECTIVELY AND INTELLIGENTLY DISPLAYING AUTHENTICATION NOTIFICATIONS TO PROTECT USERS

(71) Applicant: MICROSOFT TECHNOLOGY LICENSING, LLC, Redmond, WA (US)

(72) Inventors: Poulomi Bandyopadhyay, Sammamish, WA (US); Rajat Luthra, Redmond, WA (US); Lee Francis Walker, Blacksburg, VA (US); Zachary Michael Edwards, Monroe, WA (US); Colin Trent, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 149 days.

(21) Appl. No.: 18/146,766

(22) Filed: Dec. 27, 2022

(65) Prior Publication Data
US 2024/0129299 A1    Apr. 18, 2024

Related U.S. Application Data

(60) Provisional application No. 63/416,464, filed on Oct. 14, 2022.

(51) Int. Cl.
*H04L 9/40* (2022.01)
(52) U.S. Cl.
CPC ........ *H04L 63/083* (2013.01); *H04L 63/0807* (2013.01)
(58) Field of Classification Search
CPC ................ H04L 63/083; H04L 63/0807
See application file for complete search history.

(56) References Cited

U.S. PATENT DOCUMENTS 7,181,495 B2 *  2/2007  Skladman ............. H04L 51/224
                                                 709/204
9,402,181 B1 *  7/2016  Yi ......................... H04L 63/08
(Continued)

FOREIGN PATENT DOCUMENTS

WO        2022109543 A1      5/2022

OTHER PUBLICATIONS

International Search Report and Written Opinion received for PCT Application No. PCT/US23/032808, mailed on Dec. 1, 2023, 13 pages.
(Continued)

*Primary Examiner* — Jimmy H Tran
(74) *Attorney, Agent, or Firm* — David Foster; Newport IP, LLC (57) ABSTRACT

Authentication request notifications are selectively suppressed, reducing notification fatigue and susceptibility to social engineering attacks. Authentication request notifications may be suppressed by not presenting a push notification on the user's phone. The authentication request may still be accessed and approved by manually opening the authenticator app. Notifications may be suppressed based on an estimation that the person attempting to login is not who they say they are. This estimation may be based on applying heuristics and/or machine learning models to the context of the login attempt, such as the IP address that originated the login request, time of day, recent user actions, patterns of previous logins, etc. One heuristic determines that the user has repeatedly ignored notifications caused by a particular IP address. Machine learning models generate a risk score from the login context, and notifications may be suppressed if the risk score exceeds a threshold.

20 Claims, 9 Drawing Sheets

(56) References Cited

U.S. PATENT DOCUMENTS

| | | | | |
|---|---|---|---|---|
| 9,571,497 | B1* | 2/2017 | Venkataramani | H04L 63/10 |
| 9,699,203 | B1* | 7/2017 | Yang | H04L 63/308 |
| 11,102,244 | B1* | 8/2021 | Jakobsson | H04L 51/42 |
| 12,086,808 | B1* | 9/2024 | Shahidzadeh | G06Q 20/425 |
| 2014/0189808 | A1* | 7/2014 | Mahaffey | G06F 21/6245 726/4 |
| 2016/0219039 | A1* | 7/2016 | Houthooft | H04L 63/0815 |
| 2017/0086069 | A1* | 3/2017 | Liu | H04L 9/3213 |
| 2017/0142090 | A1* | 5/2017 | Mahaffey | H04L 63/083 |
| 2017/0352028 | A1* | 12/2017 | Vridhachalam | G06Q 20/38215 |
| 2019/0065777 | A1* | 2/2019 | Ravuvari | H04W 12/02 |
| 2020/0145458 | A1* | 5/2020 | Kumar | H04L 63/145 |
| 2021/0084062 | A1* | 3/2021 | Wang | H04L 63/1425 |
| 2021/0136060 | A1* | 5/2021 | Raounak | H04W 4/023 |
| 2021/0136063 | A1* | 5/2021 | Cheek | H04W 12/12 |
| 2021/0389999 | A1* | 12/2021 | Malireddi | G06Q 10/10 |
| 2022/0129904 | A1* | 4/2022 | Gerling-Ospina | G06Q 20/354 |
| 2022/0158999 | A1* | 5/2022 | Kaidi | H04L 63/0884 |
| 2022/0182369 | A1* | 6/2022 | Eisen | H04W 12/068 |
| 2022/0255920 | A1* | 8/2022 | Bester | H04L 9/3073 |
| 2022/0311763 | A1* | 9/2022 | Krishan | H04L 63/0853 |
| 2023/0089920 | A1* | 3/2023 | Post | H04L 63/1416 726/5 |
| 2023/0195863 | A1* | 6/2023 | Xu | H04L 63/107 726/22 |
| 2023/0300126 | A1* | 9/2023 | Smith-Rose | H04L 63/0236 726/4 |
| 2024/0098113 | A1* | 3/2024 | Rajakumar | H04L 63/08 |
| 2024/0273411 | A1* | 8/2024 | Mueck | H04L 9/3263 |

OTHER PUBLICATIONS

Burgess, Brian, "How to Hide Spam Texts from Unknown Senders on iPhone", Retrieved from: https://www.groovypost.com/howto/hide-spam-texts-from-unknown-senders-on-iphone/, Jan. 30, 2022, 35 Pages.

U.S. Appl. No. 63/416,464 filed Oct. 14, 2022.

International Preliminary Report on Patentability received for PCT Application No. PCT/US23/032808, mailed on Apr. 24, 2025, 08 pages.

* cited by examiner

SELECTIVELY AND INTELLIGENTLY DISPLAYING AUTHENTICATION NOTIFICATIONS TO PROTECT USERS

PRIORITY APPLICATION

This application claims the benefit of and priority to U.S. Provisional Application No. 63/416,464, filed Oct. 14, 2022, the entire contents of which are incorporated herein by reference.

BACKGROUND

Cybersecurity is a constantly evolving battle between attackers and security professionals. Traditionally, authentication was performed with a username and password. However, attackers have developed techniques to purchase, leak, guess, and/or steal passwords. Security professionals responded by implementing two-factor authentication. Initially, one factor was a knowledge factor, such as a password. The second factor was a possession factor, such as possession of a smart phone tied to the user's account. The user could establish possession of the smart phone by providing a confirmation code received via a phone call or text message. Both factors had to be satisfied in order to authenticate the user.

It is with respect to these and other considerations that the disclosure made herein is presented.

SUMMARY

In some configurations, authentication request notifications are selectively suppressed, reducing notification fatigue and probability of an accidental approval. Authentication request notifications may be suppressed by not presenting a push notification on the user's phone. The authentication request may still be accessed and approved by manually opening the authenticator app. Notifications may be suppressed based on an estimation that the person attempting to login is not who they say they are. This estimation may be based on applying heuristics and/or machine learning models to the context of the login attempt, such as the user's sign-in history, the IP address that originated the login request, time of day, recent user actions, patterns of previous logins, etc. Once a heuristic determines that the user has repeatedly ignored notifications caused by a particular IP address, subsequent notifications may be suppressed for a dynamically determined cool-off period. Machine learning models generate a risk score from the login context, and notifications may be suppressed if the risk score exceeds a threshold.

Additional heuristics for identifying suspicious login attempts are also contemplated. For example, a login attempt may be deemed suspicious if it comes from an unfamiliar geographical location or from an unfamiliar IP address. A login attempt from a particular IP address may also be deemed suspicious if the user explicitly denied a previous authentication request caused by that IP address. This list of heuristics is not exhaustive, nor is the list of data points that these heuristics are based on.

If a login attempt is correctly determined to be fraudulent, then the user will not be expecting an authentication request, and so suppressing an authentication request notification is consistent with the user's expectations. The user will not be frustrated by repeated notifications, and so the user will be less susceptible to social engineering attacks. Furthermore, suppressing spurious authentication requests prevents erosion of faith in the website, the authenticator app, and password-free logins generally. Authentication request notifications may be suppressed for any type of authentication request, e.g., a simple approve/deny request, a request that requires entering a short authentication code provided by the website, etc.

However, sometimes a legitimate login attempt will incorrectly be identified as fraudulent, and so notifications will be suppressed by mistake. This may confuse the user, who sees from the website to expect an authentication request that never materializes. To address this, the website may also instruct the user to open the authenticator app manually to find and approve the authentication request. While more cumbersome than responding to a push notification, the user knows to manually find and respond to the authentication request because the user initiated the login.

In addition to suppressing authentication request notifications, notifications may also be throttled based on notification velocity. As referred to herein, throttling limits the number of notifications that a user can be presented with over a period of time. Any authentication requests above the throttling limit will not be presented in a notification, but may still be manually accessed from the authenticator app. Throttling may occur over different time periods, e.g., based on a number of notifications received in the last 1, 5, or 30 minutes. Throttling may also be triggered by exceeding a number of notifications recently received compared to a historical average number of notifications received—e.g., the number of notifications received in the past 5 minutes compared to the average number of notifications received over 5 minutes in the past month.

Existing authenticator app-based solutions do not throttle or suppress notifications based on an analysis of the context of a login request. Instead, existing authenticator app-based solutions treat notifications as all-or-nothing. As a result, existing authenticator app-based solutions overwhelm users, leading to notification fatigue and increasing vulnerability to notification fatigue attacks. Based on historical research, between 0.05% and 2% of fraudulent authentication requests with simply approve/deny options are approved, causing a significant financial and emotional toll.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

While confirmation codes made illicit access harder, attackers defeat these measures by stealing a user's phone. With possession of a user's phone—or just a Subscriber Identity Module (SIM) card—the attacker has access the user's voice calls and/or text messages, from which the attacker can obtain the confirmation code. For example, an attacker may obtain a user's password and phone number from a large scale data breach. The attacker may then walk into a mobile phone store, claim that they have lost their phone, and ask for a replacement. In reality, the attacker is using the stolen password and phone number to pose as the user. The replacement phone/SIM card will replace the user's SIM card on the cell phone network, enabling the attacker to receive the user's confirmation codes.

Security professionals have addressed the threat of a stolen phone with authenticator apps. Authentication apps run on smart phones and use biometric information to confirm the identity of the user. For example, when a user attempts to login to a website, the website sends an authentication request to the authenticator app. The authenticator app then displays a notification requesting confirmation that the login attempt is legitimate. Once the user confirms the request, the authenticator app uses biometric information such as a fingerprint scan, voiceprint, or face identification to confirm the user's identity.

An authenticator app provides two factor authentication—a possession factor and an inheritance factor. The possession factor confirms that the user possesses their phone. Using the authenticator app establishes possession. The inheritance factor confirms that the user is who they say they are, typically based on biometric information. In some cases, the two factors provided by the authenticator app remove the need for a knowledge factor, such as a password, greatly improving security.

Attackers have attempted to circumvent authenticator apps using social engineering. Knowing just a username, the attacker causes the user to receive a large number of authentication request notifications. For example, the attacker may make multiple login attempts under the user's account. The attacker hopes that the user will accidentally approve one of these requests, granting the attacker access to the user's account.

Security professionals have responded by making it more difficult to absentmindedly approve an authentication request. For example, when logging into a website, the website may provide a short authentication code. When responding to the authentication request notification, the user must enter the authentication code into the authenticator app before access is granted.

However, attackers use another type of social engineering to obtain this authentication code—calling the user and asking for it. For example, an attacker may initiate a number of login attempts, causing the user to receive a number of authentication request notifications. Over time the user may become annoyed at the repeated notifications, and may even suspect that someone is attempting to hack into their account. At this point, the attacker calls the user, impersonates a security professional, and asks the user to enter an authentication code into the authenticator app. For example, the attacker receives the authentication code "23" while initiating a login to the user's account. The attacker then calls the user and says "This is corporate security. Please type '23' into your authenticator app to stop receiving these notifications." If the user complies, the attacker can gain access to the user's account.

Figure 1A:
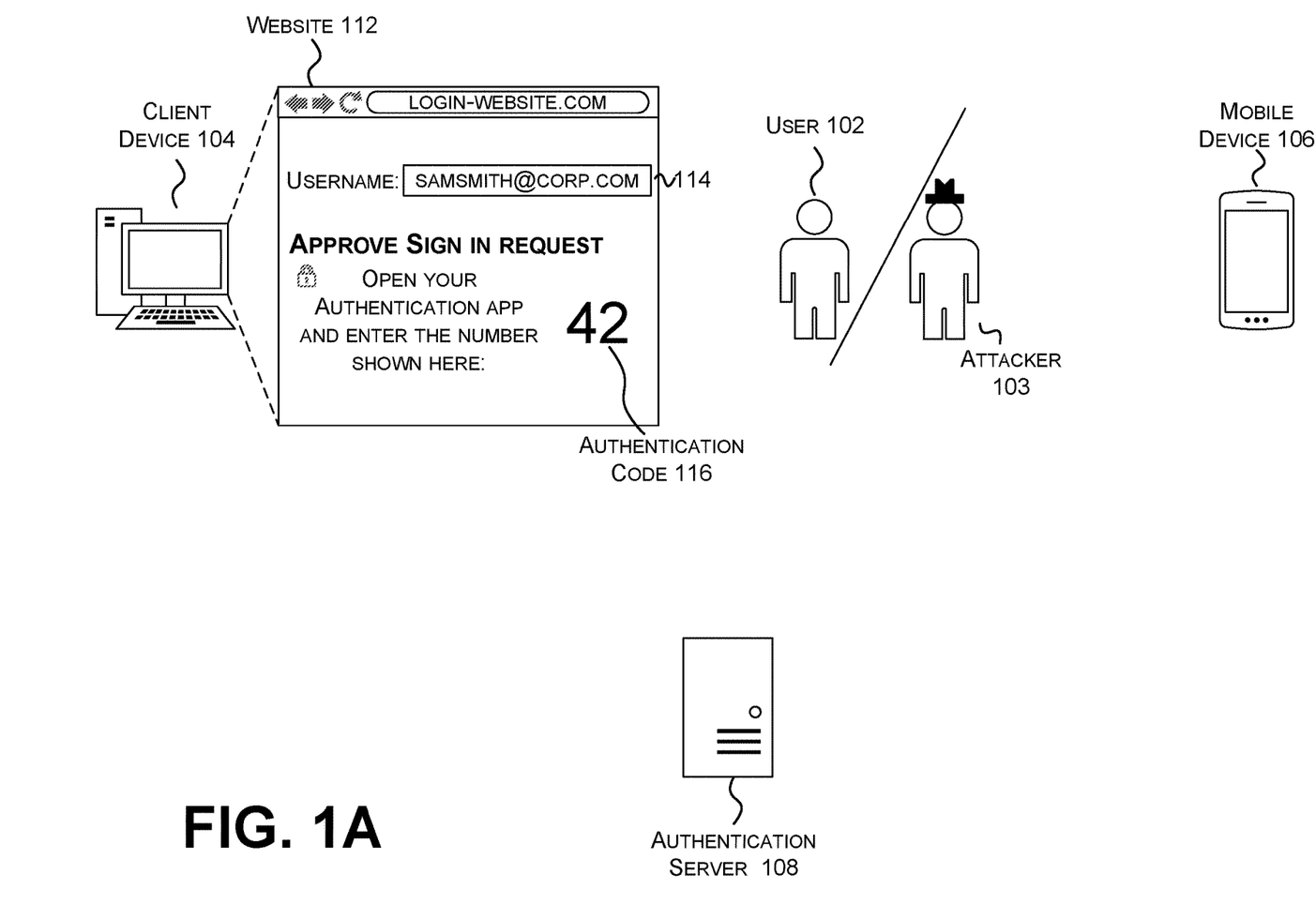
FIG. 1A illustrates a user attempting to login into a website.

FIG. 1A illustrates a user 102 attempting to login into a website 112. User 102 is operating client device 104, which may be any type of computing device such as a laptop, desktop, mobile device, mobile phone, tablet or the like. User 102 is also in possession of mobile device 106—in addition to client device 104. Website 112 may be any website, operating system, account, application, or other functionality that is secured for exclusive use by individual users. For example, website 112 may be an online banking website. Attacker 103 illustrates a person who is not who they say they are. Authentication server 108 will receive a login request derived from the login attempt performed by user 102 or attacker 103.

User 102 has navigated to website 112, where a login prompt is provided. User 102 enters their username in field 114. In some scenarios, user 102 is not required to provide a password, instead relying on two factors of authentication provided by an authentication app. In other scenarios, user 102 may also be required to provide a password or some other secret that acts as a knowledge factor.

In some configurations, a simple approve/deny authentication confirmation will be presented by the authentication app. In these configurations, user 102 is not presented with authentication code 116, as user 102 only has to make a simple approve/deny selection within the authentication app.

In other configurations, website 112 presents authentication code 116 to user 102. User 102 will provide this authentication code 116 to the authentication app when approving the authentication request. Authentication codes are utilized to reduce the chance that user 102 inadvertently approves an authentication request. This is accomplished by requiring that user 102 consciously remember authentication code 116 as displayed by client device 104 and enter it into the authentication app.

Figure 1B:
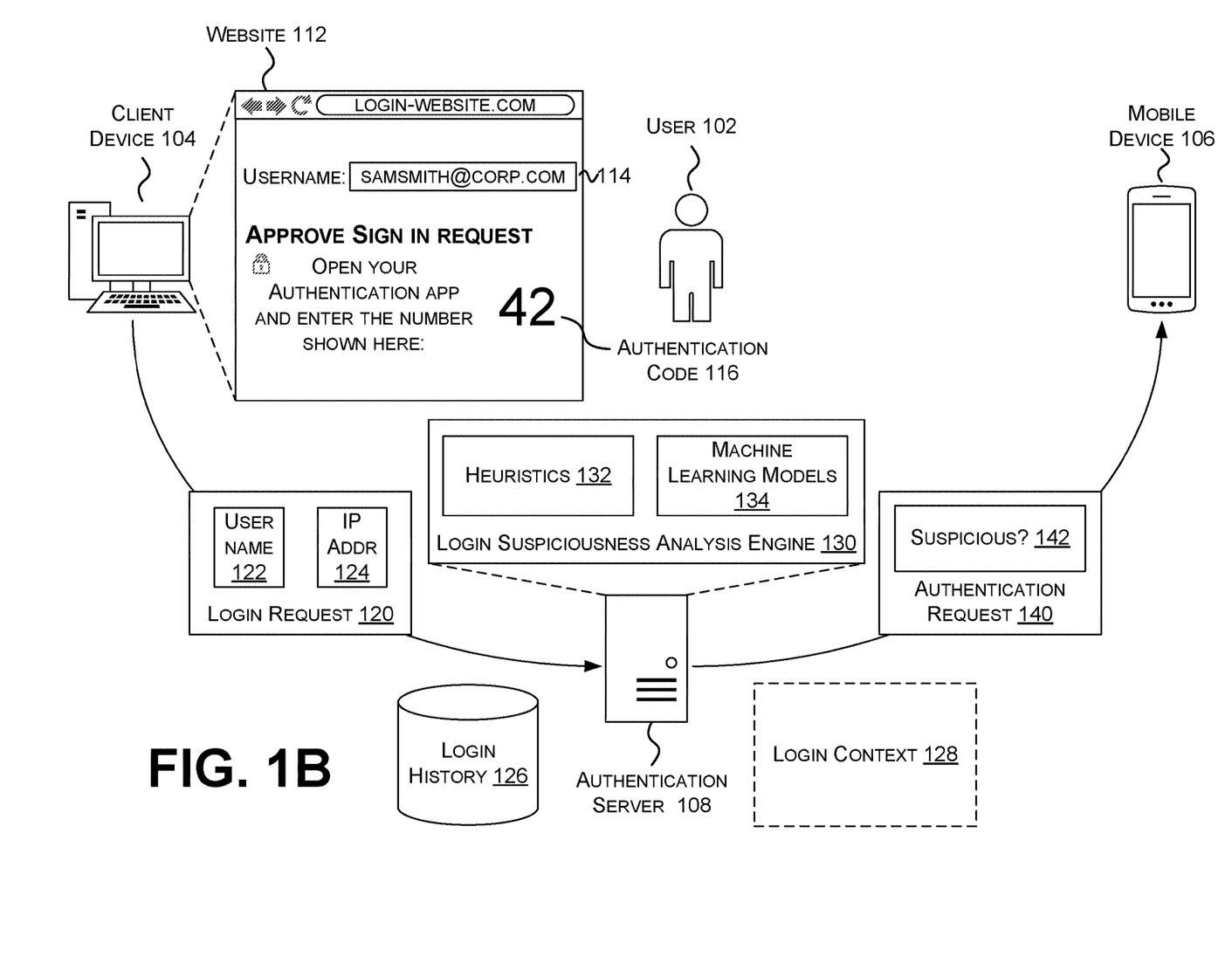
FIG. 1B illustrates an authentication server processing a login request.

FIG. 1B illustrates authentication server 108 processing login request 120. In some configurations, the result of authentication server 108 processing login request 120 is authentication request 140, which is provided to mobile device 106 for user 102 to approve or deny. Approving or denying authentication request 140 determines whether login request 120 will be granted.

Login request 120 includes username 122 and IP address 124. Username 122 is the username entered by user 102 into field 114. IP address 124 is the IP address of client device 104. Username 122 and IP address 124 are examples of information found in a login context 128 of login request 120. Login context 128 may include additional information obtained from client device 104, such as a preferred language of user 102, the type and version of web browser used to render website 112, and the like. Login context 128 may also include information that is not obtained from client device 104, such as a login history 126 of user 102, the time of day, and the like. Login history 126 may include records of previous login requests and the corresponding login contexts for user 102 and other users of authentication server 108.

Login suspiciousness analysis engine 130 is a part of authentication server 108 that processes login request 120. Log in suspiciousness analysis engine 130 may apply heuristics 132 and/or machine learning models 134 to login request 120 and login context 128 to determine if login request 120 is suspicious.

For example, an 'ignored' heuristic may determine if user 102 has ignored a defined number of authentication requests 140 that were associated with the same IP address 124. If so, login request 120 may be deemed suspicious. Authentication server 108 will still provide authentication request 140 to mobile device 106 for the suspicious login request 120, setting Suspicious 142 to 'true'.

A "denied" heuristic determines that login request 120 is suspicious if user 102 has previously denied a login request that originated from the same IP address 124. A 'distance' heuristic determines that login request 120 is suspicious if the distance between the geographic location of client device 104 and the geographic location of mobile device 106 is greater than a defined threshold. An 'unfamiliar location' heuristic determines that login 120 is suspicious if client device 104 is in a location where user 102 has not logged in from before. When applying these heuristics, locations may be determined by GPS, IP address, wireless signal triangulation, or any other technique for determining a device's location. Also, when applying these heuristics, location familiarity, a user's history of ignoring notifications, and other historical data may be obtained from login history 126.

Machine learning models 134 may be trained on some or all of the same context data 128 used by heuristics 132, along with manual annotations indicating whether a login attempt turned out to be legitimate or an attack. Once trained, machine learning models 134 may be used to infer a probability that a login attempt is legitimate. If this "risk rate" is greater than a defined threshold, then authentication request 140 will be transmitted to mobile device 106 with suspicious 142 set to true. If neither heuristics 132 nor machine learning models 134 identify login request 120 as suspicious, authentication request 140 will be sent to mobile device 106 with suspicious 142 set to 'false'.

Figure 1C:
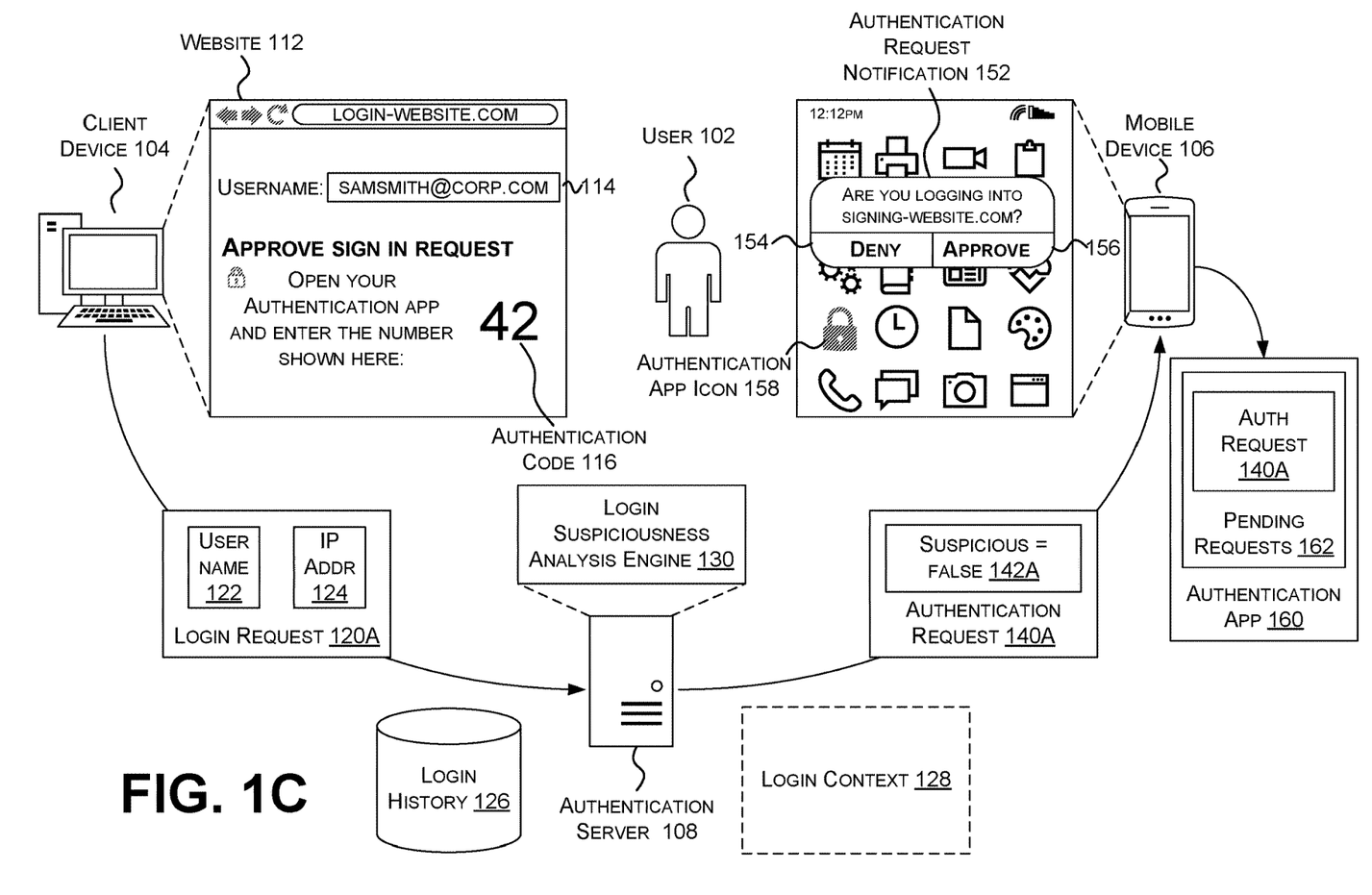
FIG. 1C illustrates a notification to approve or deny a non-suspicious login attempt.

FIG. 1C illustrates a notification 152 to approve 156 or deny 154 a non-suspicious login attempt. As illustrated, authentication request 140A has suspicious 142A set to false. Authentication app 160 receives authentication request 140A and stores it in pending requests 162. Pending requests 162 holds a list of pending authorization requests, both suspicious and non-suspicious.

Authentication app 160 also generates, or causes a host operating system to generate, authentication request notification 152. Authentication request notification 152 may be in the form of a pop-up that must be dismissed before user 102 may continue using mobile device 106. In other configurations, authentication request notification 152 does not take the focus of mobile device 106, but briefly displays the notification before vanishing.

Authentication request notification 152 is in the form of a pop up with two buttons: deny 154 and approve 156. User 102 may press approve 156 to authorize access to the account with username 122. Similarly, user 102 may press deny 154 to deny authorization to the account with username 122. Authentication request notification 152 may contain additional information such as the username 122, the URL of the website that user 102 wants to access, any of context information 128, and/or any of login history 126. Authentication app 160 sends a notification to authentication server 108 indicating whether the user selected deny 154 or approve 156.

Figure 1D:
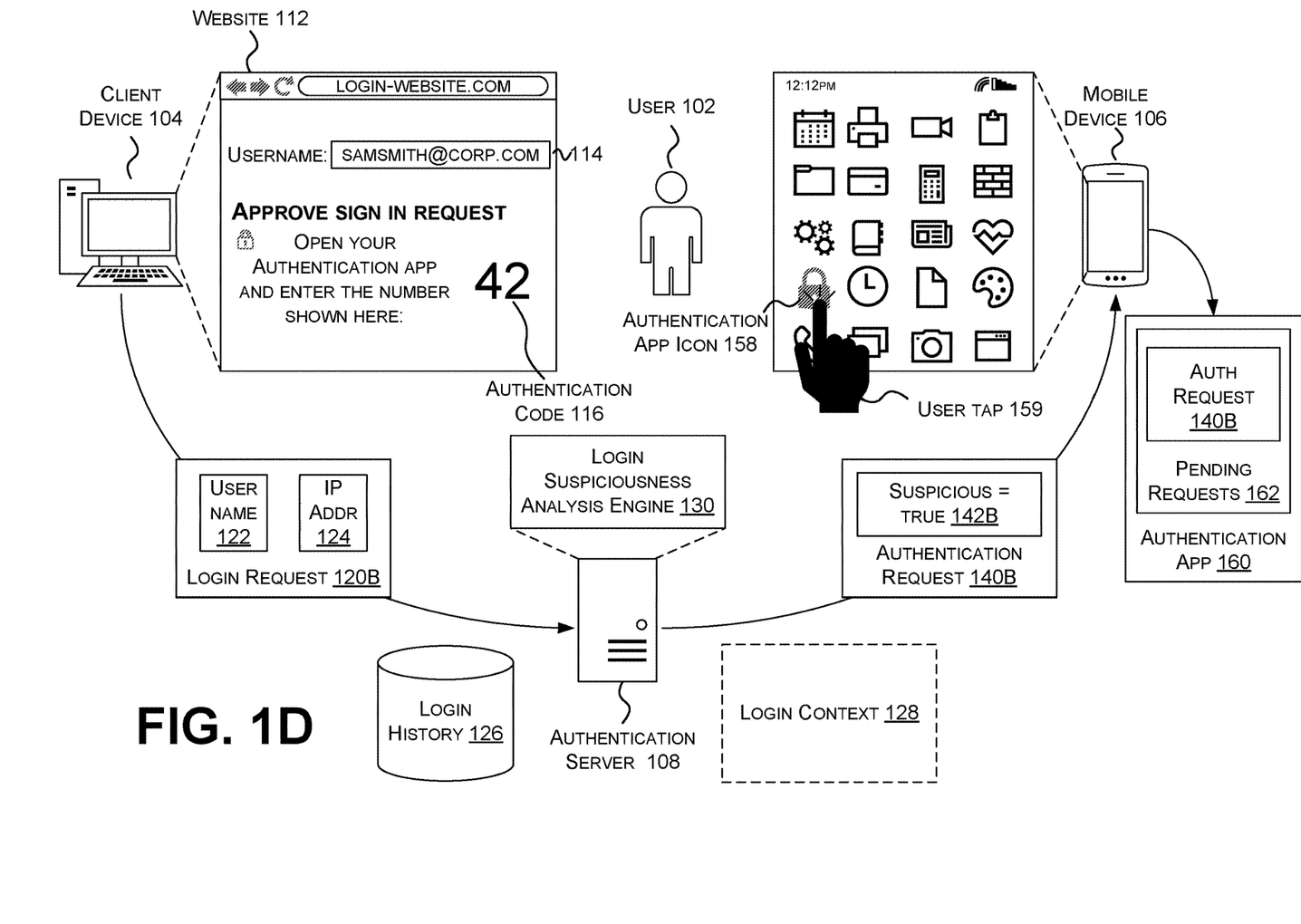
FIG. 1D illustrates suppressing a notification to approve or deny a login attempt.

FIG. 1D illustrates suppressing a notification to approve or deny a login attempt. As illustrated, login request 120 be has been deemed suspicious 142B by authentication server 108. Accordingly, authentication request 140B is not presented as a notification, but instead is stored in pending requests 162.

In order to approve or deny authentication request 140B, user 102 must manually open authentication app 160 and find it. In some configurations, website 112 tells user 102 to look in their authentication app 160 for the authentication request 140B. As illustrated, authentication app icon 158 is pressed by user tap 159 to launch authentication app 160.

Figure 1E:
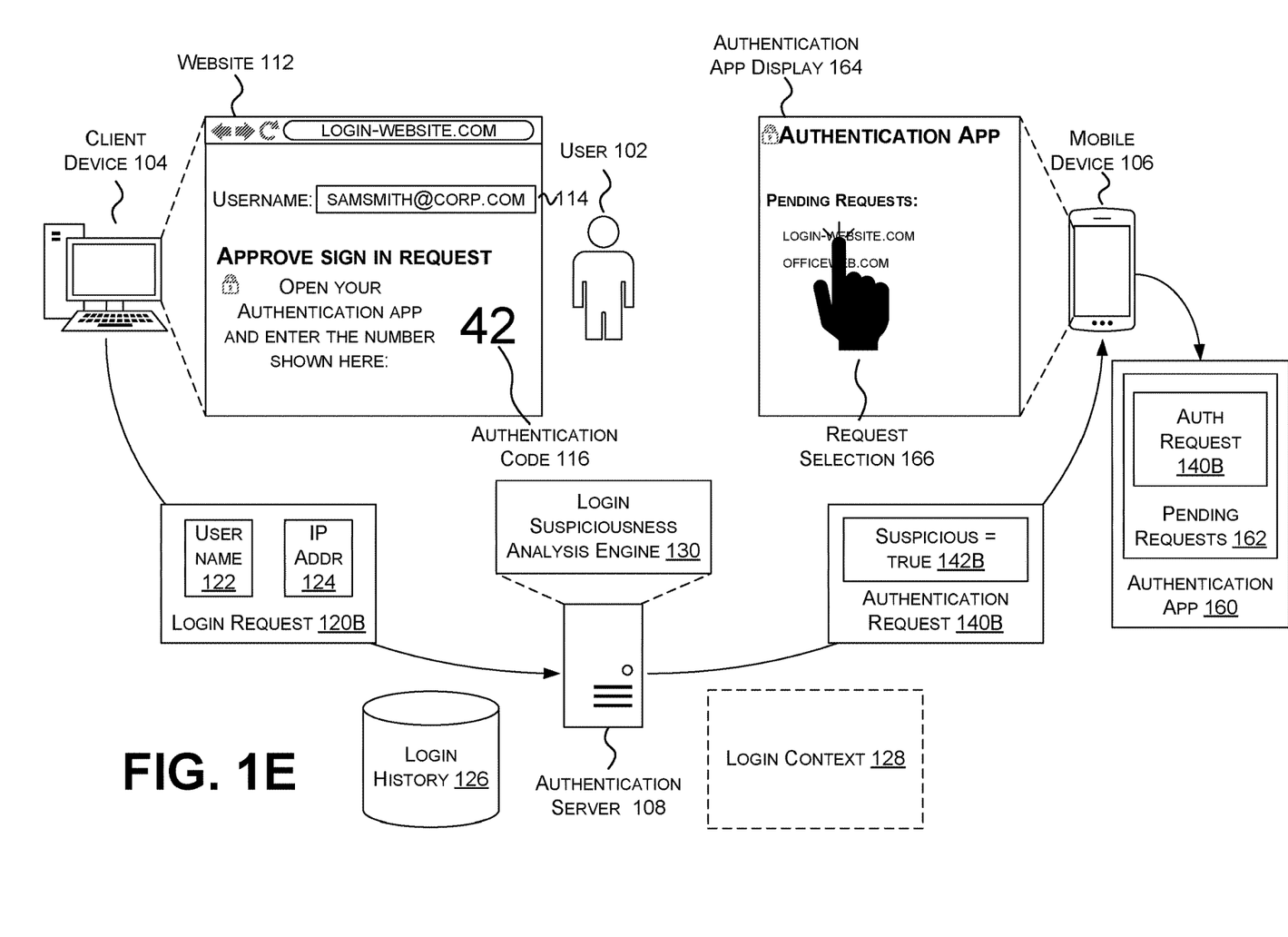
FIG. 1E illustrates finding and selecting an authentication request.

FIG. 1E illustrates finding and selecting suppressed authentication request 140B. Authentication app display 164 depicts a list of pending authentication requests 162—both suppressed and not suppressed authentication requests. As illustrated, each request is identified with the URL of the website being logged into, although username 122 or any other information is similarly contemplated to be displayed for each request. Request selection 166 selects authentication request 140B.

Figure 1F:
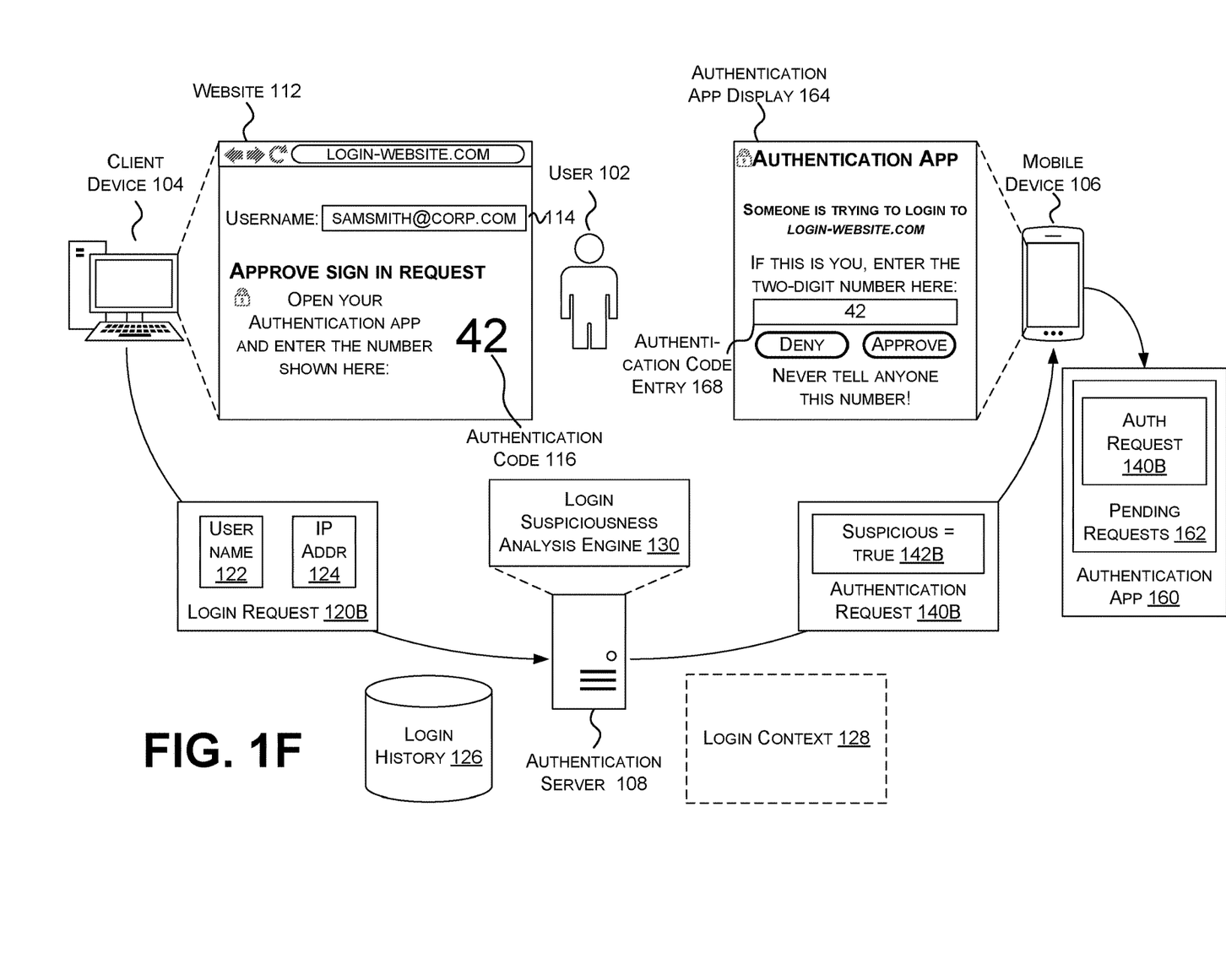
FIG. 1F illustrates supplying an authentication code to approve an authentication request.

FIG. 1F illustrates supplying an authentication code to approve an authentication request that had its notification suppressed. While some authentication requests are simple approve/deny requests, as illustrated in FIG. 1C, other authentication requests require entering an authentication code 116 obtained from website 112. Forcing user 102 to enter authentication code 116 reduces the chance that user 102 will errantly approve an authentication they did not initiate. Whether an authentication code request is a simple approve/deny request or an authentication code request does not affect whether it may be displayed in a push notification 152 or whether it is suppressed and has to be accessed by manually opening authentication app 160 and selecting it from a list.

Figure 2:
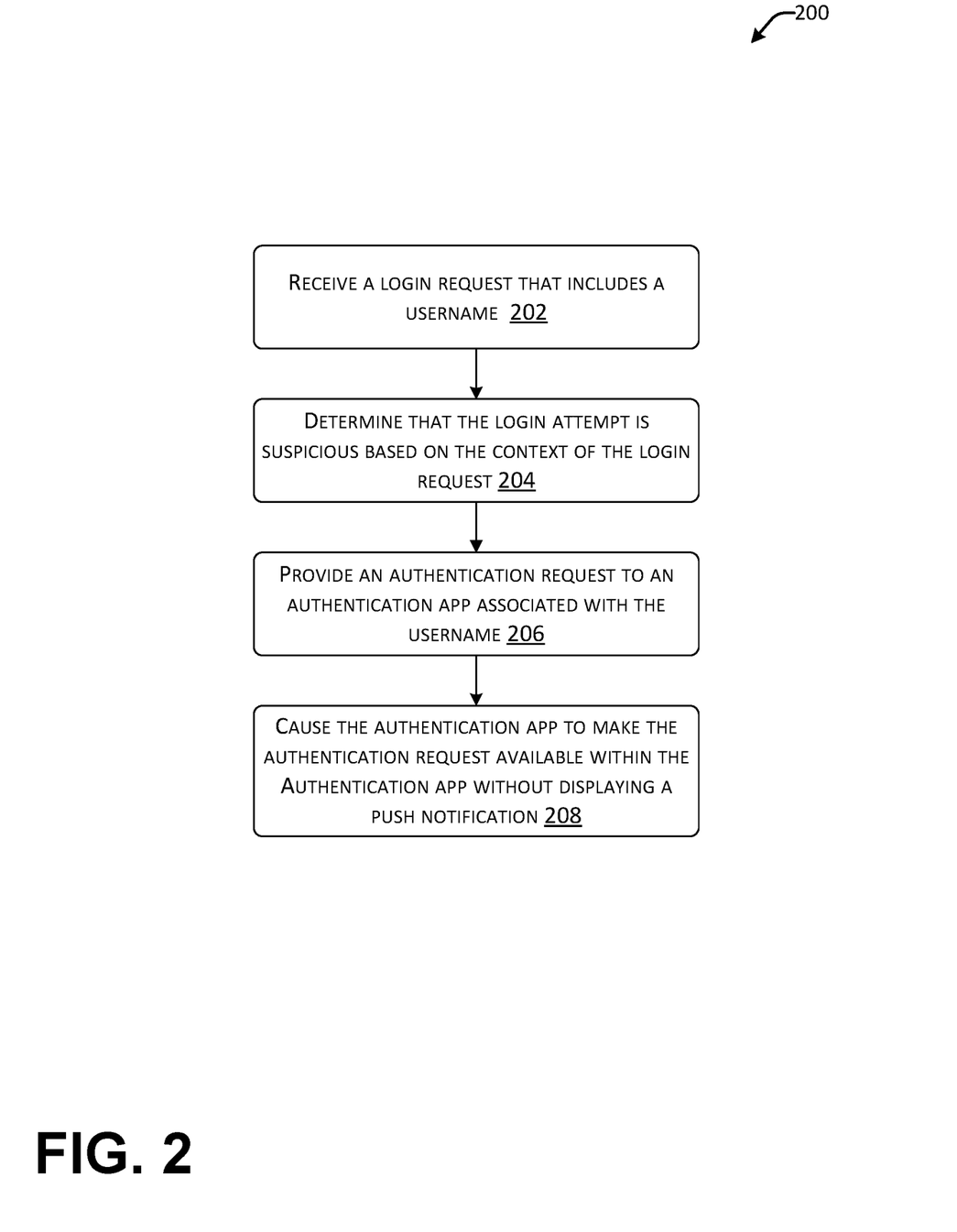
FIG. 2 is a flow diagram of an example method for selectively displaying multifactor authentication notifications.

Turning now to FIG. 2, aspects of a routine for selectively displaying multifactor authentication notifications is shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

With reference to FIG. 2, routine 200 begins at operation 202, where a login attempt 120 that includes a username 122 is received.

Next at operation 204, a determination is made that the login request 120 is suspicious based on the login context 128 of the login request 120.

Next at operation 206, an authentication request 140B is provided to an authentication app 160 that is associated with the username 122.

Next at operation 208, the authentication app 160 is caused to make the authentication request 140B available within the authentication app 160 without displaying an authentication request push notification 152.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 200 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 200 may be also implemented in many other ways. For example, the routine 200 may be implemented, at least in part, by a processor of another remote computer or a local circuit. In addition, one or more of the operations of the routine 200 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 3:
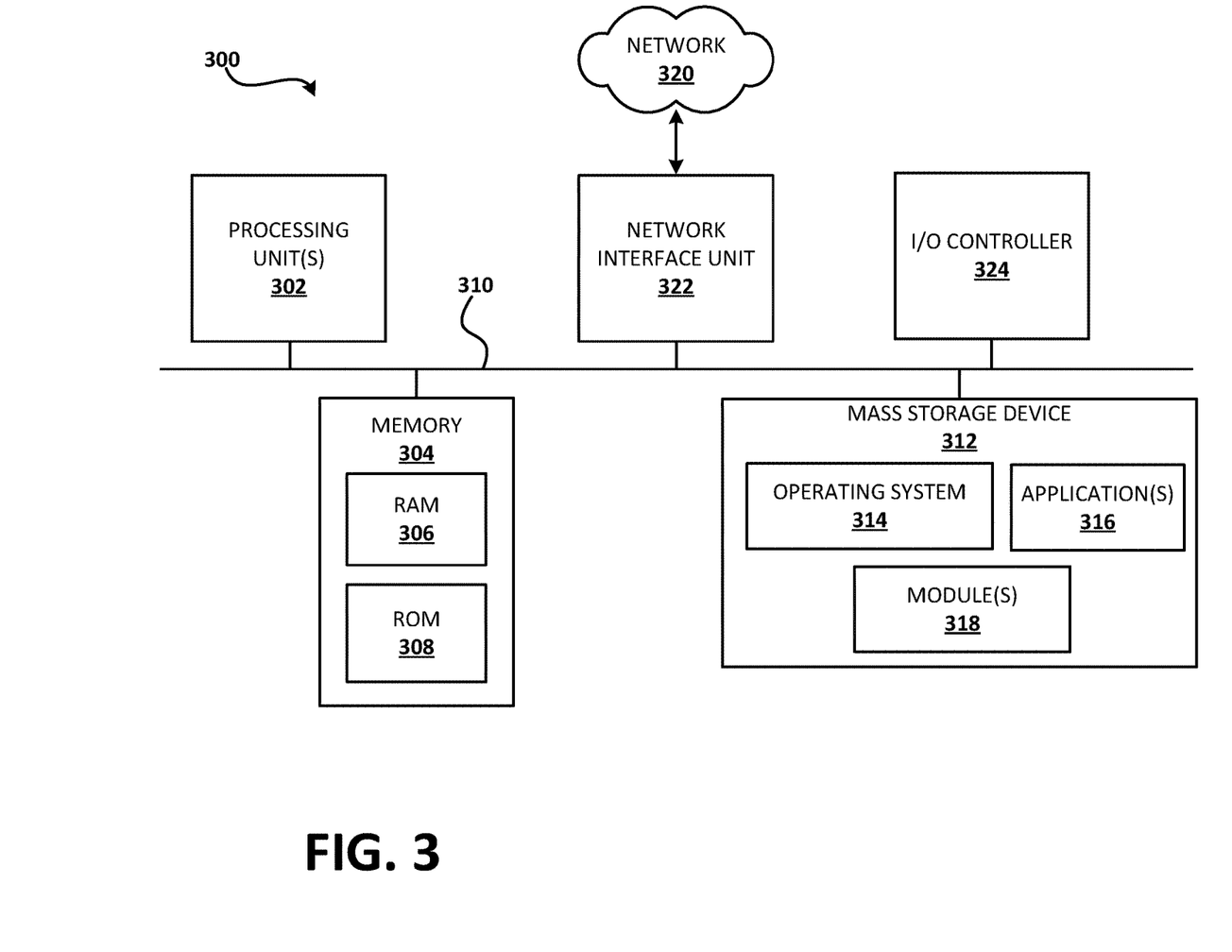
FIG. 3 is a computer architecture diagram illustrating an illustrative computer hardware and software architecture for a computing system capable of implementing aspects of the techniques and technologies presented herein.

FIG. 3 shows additional details of an example computer architecture 300 for a device, such as a computer or a server configured as part of the systems described herein, capable of executing computer instructions (e.g., a module or a program component described herein). The computer architecture 300 illustrated in FIG. 3 includes processing unit(s) 302, a system memory 304, including a random-access memory 306 ("RAM") and a read-only memory ("ROM") 308, and a system bus 310 that couples the memory 304 to the processing unit(s) 302.

Processing unit(s), such as processing unit(s) 302, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 300, such as during startup, is stored in the ROM 308. The computer architecture 300 further includes a mass storage device 312 for storing an operating system 314, application(s) 316, modules 318, and other data described herein.

The mass storage device 312 is connected to processing unit(s) 302 through a mass storage controller connected to the bus 310. The mass storage device 312 and its associated computer-readable media provide non-volatile storage for the computer architecture 300. Although the description of computer-readable media contained herein refers to a mass storage device, it should be appreciated by those skilled in the art that computer-readable media can be any available computer-readable storage media or communication media that can be accessed by the computer architecture 300.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 300 may operate in a networked environment using logical connections to remote computers through the network 320. The computer architecture 300 may connect to the network 320 through a network interface unit 322 connected to the bus 310. The computer architecture 300 also may include an input/output controller 324 for receiving and processing input from a number of other devices, including a keyboard, mouse, touch, or electronic stylus or pen. Similarly, the input/output controller 324 may provide output to a display screen, a printer, or other type of output device.

It should be appreciated that the software components described herein may, when loaded into the processing unit(s) 302 and executed, transform the processing unit(s) 302 and the overall computer architecture 300 from a general-purpose computing system into a special-purpose computing system customized to facilitate the functionality presented herein. The processing unit(s) 302 may be constructed from any number of transistors or other discrete circuit elements, which may individually or collectively assume any number of states. More specifically, the processing unit(s) 302 may operate as a finite-state machine, in response to executable instructions contained within the software modules disclosed herein. These computer-executable instructions may transform the processing unit(s) 302 by specifying how the processing unit(s) 302 transition between states, thereby transforming the transistors or other discrete hardware elements constituting the processing unit(s) 302.

Figure 4:
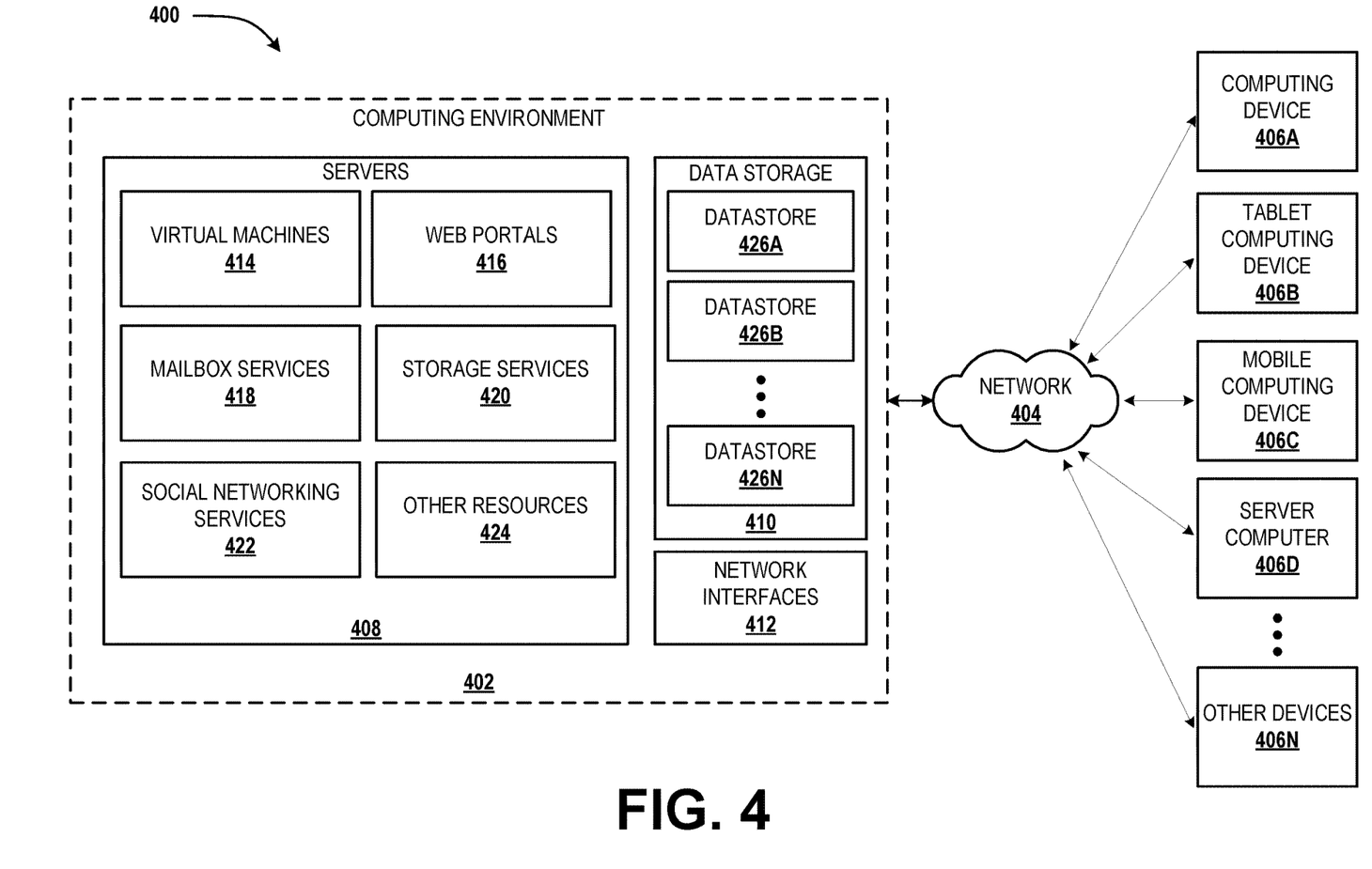
FIG. 4 is a diagram illustrating a distributed computing environment capable of implementing aspects of the techniques and technologies presented herein.

FIG. 4 depicts an illustrative distributed computing environment 400 capable of executing the software components described herein. Thus, the distributed computing environment 400 illustrated in FIG. 4 can be utilized to execute any aspects of the software components presented herein. For example, the distributed computing environment 400 can be utilized to execute aspects of the software components described herein. Accordingly, the distributed computing environment 400 can include a computing environment 402 operating on, in communication with, or as part of the network 404. The network 404 can include various access networks. One or more client devices 406A-406N (hereinafter referred to collectively and/or generically as "clients 406" and also referred to herein as computing devices 406) can communicate with the computing environment 402 via the network 404. In one illustrated configuration, the clients 406 include a computing device 406A such as a laptop computer, a desktop computer, or other computing device; a slate or tablet computing device ("tablet computing device") 406B; a mobile computing device 406C such as a mobile telephone, a smart phone, or other mobile computing device; a server computer 406D; and/or other devices 406N. It should be understood that any number of clients 406 can communicate with the computing environment 402.

In various examples, the computing environment 402 includes servers 408, data storage 410, and one or more network interfaces 412. The servers 408 can host various services, virtual machines, portals, and/or other resources. In the illustrated configuration, the servers 408 host virtual machines 414, Web portals 416, mailbox services 418, storage services 420, and/or, social networking services 422. As shown in FIG. 4 the servers 408 also can host other services, applications, portals, and/or other resources ("other resources") 424.

As mentioned above, the computing environment 402 can include the data storage 410. According to various implementations, the functionality of the data storage 410 is provided by one or more databases operating on, or in communication with, the network 404. The functionality of the data storage 410 also can be provided by one or more servers configured to host data for the computing environment 402. The data storage 410 can include, host, or provide one or more real or virtual datastores 426A-426N (hereinafter referred to collectively and/or generically as "datastores 426"). The datastores 426 are configured to host data used or created by the servers 408 and/or other data. That is, the datastores 426 also can host or store web page documents, word documents, presentation documents, data structures, algorithms for execution by a recommendation engine, and/or other data utilized by any application program. Aspects of the datastores 426 may be associated with a service for storing files.

The computing environment 402 can communicate with, or be accessed by, the network interfaces 412. The network interfaces 412 can include various types of network hardware and software for supporting communications between two or more computing devices including, but not limited to, the computing devices and the servers. It should be appreciated that the network interfaces 412 also may be utilized to connect to other types of networks and/or computer systems.

It should be understood that the distributed computing environment 400 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 400 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 400 to utilize the functionality described herein for providing the techniques disclosed herein, among other aspects.

The present disclosure is supplemented by the following example clauses:

Example 1: A method comprising: receiving a login request, wherein the login request comprises a username; determining that the login request is suspicious based on a login context of the login request; and sending an authentication request to an authenticator app that is associated with the username, causing the authenticator app to make the authentication request available within the authenticator app without displaying a push notification.

Example 2: The method of Example 1, further comprising: causing the authenticator app to suppress a push notification associated with the authentication request.

Example 3: The method of Example 1, further comprising: causing a device on which the authenticator app is running to suppress a push notification associated with the authentication request.

Example 4: The method of Example 1, wherein the login request is determined to be suspicious based on a determination that more than a defined number of login requests have been received over a defined period of time.

Example 5: The method of Example 4, wherein the defined number of login requests is determined based on a historical average number of login requests.

Example 6: The method of Example 1, wherein the login request is determined to be suspicious based on a determination that more than a defined number of ignored login requests have been received over a defined period of time.

Example 7: The method of Example 1, wherein the login request is received by a login website, wherein the login website displays an authentication code, and wherein the authenticator app allows the login request to succeed in response to receiving the authentication code.

Example 8: A computer-readable storage medium having computer-executable instructions stored thereupon that, when executed by a processing system, cause the processing system to: receive a login request, wherein the login request comprises a username; determine that the login request is suspicious based on a login context of the login request; and send an authentication request to an authenticator app that is associated with the username, causing the authenticator app to make the authentication request available within the authenticator app without displaying a push notification.

Example 9: The computer-readable storage medium of Example 8, wherein the login context includes an IP address of a client device that provided the login request.

Example 10: The computer-readable storage medium of Example 8, wherein the login request is determined to be suspicious based on a login history of the username.

Example 11: The computer-readable storage medium of Example 10, wherein the login history of the username includes login contexts of previous login requests associated with the username.

Example 12: The computer-readable storage medium of Example 8, wherein the login request is determined to be suspicious based on a determination that a defined number of login requests for the username have been ignored over a defined amount of time.

Example 13: The computer-readable storage medium of Example 8, wherein the authenticator app is caused to display the authentication request in response to a user manually opening a list of authentication requests in the authenticator app.

Example 14: The computer-readable storage medium of Example 8, wherein the login request is determined to be suspicious based on a determination that the login request originates from a same IP address as a previous login request and that the an individual authentication request associated with the previous login request was denied.

Example 15: The computer-readable storage medium of Example 8, wherein the login request is determined to be suspicious based on a determination that the login request originates from a geographical location that is greater than a defined distance from a mobile device running the authenticator app.

Example 16: The computer-readable storage medium of Example 8, wherein the login request is determined to be suspicious based on a determination that the login request originates from a geographical location that is new for the username.

Example 17: The computer-readable storage medium of Example 8, wherein the login request is determined to be suspicious based on a risk score generated by a machine learning model that is provided the login context as input.

Example 18: A processing system, comprising: a processor; and a computer-readable storage medium having computer-executable instructions stored thereupon that, when executed by the processing system, cause the processing system to: receive a login request, wherein the login request comprises a username; determine that the login request is suspicious based on a login context of the login request; and send an authentication request to an authenticator app that is associated with the username, wherein the authentication request comprises an indication that the login request is deemed suspicious, causing the authenticator app to suppress a push notification for the authentication request while making the authentication request available to be activated manually from within the authenticator app.

Example 19: The processing system of Example 18, wherein the authenticator app receives a manual request to view a list of pending authentication requests, and the authenticator app displays a list of pending authentication requests that includes the authentication request, and wherein the entry in the list of pending authentication requests associated with the authentication request is displayed with an indication that the login request has been deemed suspicious.

Example 20: The processing system of Example 19, wherein the authenticator app receives a user selection of the authentication request, causing the authenticator app to indicate to a server computing device to allow the login request to succeed.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
receiving a login request, wherein the login request comprises a username;
determining that the login request is suspicious based on a login context of the login request; and
sending an authentication request to an authenticator app that is associated with the username, causing the authenticator app to display the authentication request within the authenticator app in response to a user manually opening a list of authentication requests in the authenticator app.

2. The method of claim 1, further comprising:
causing the authenticator app to suppress a push notification associated with the authentication request.

3. The method of claim 1, further comprising:
causing a device on which the authenticator app is running to suppress a push notification associated with the authentication request.

4. The method of claim 1, wherein the login request is determined to be suspicious based on a determination that more than a defined number of login requests have been received over a defined period of time.

5. The method of claim 4, wherein the defined number of login requests is determined based on a historical average number of login requests.

6. The method of claim 1, wherein the login request is determined to be suspicious based on a determination that more than a defined number of ignored login requests have been received over a defined period of time.

7. The method of claim 1, wherein the login request is received by a login website, wherein the login website displays an authentication code, and wherein the authenticator app allows the login request to succeed in response to receiving the authentication code.

8. A computer-readable storage medium having computer-executable instructions stored thereupon that, when executed by a processing system, cause the processing system to:
receive a login request, wherein the login request comprises a username;
determine that the login request is suspicious based on a login context of the login request; and
send an authentication request to an authenticator app that is associated with the username, causing the authenticator app to display the authentication request within the authenticator app in response to a user manually opening a list of authentication requests in the authenticator app.

9. The computer-readable storage medium of claim 8, wherein the login context includes an IP address of a client device that provided the login request.

10. The computer-readable storage medium of claim 8, wherein the login request is determined to be suspicious based on a login history of the username.

11. The computer-readable storage medium of claim 10, wherein the login history of the username includes login contexts of previous login requests associated with the username.

12. The computer-readable storage medium of claim 8, wherein the login request is determined to be suspicious based on a determination that a defined number of login requests for the username have been ignored over a defined amount of time.

13. The computer-readable storage medium of claim 8, wherein the authenticator app is caused to display the authentication request without displaying a push notification.

14. The computer-readable storage medium of claim 8, wherein the login request is determined to be suspicious based on a determination that the login request originates from a same IP address as a previous login request and that the an individual authentication request associated with the previous login request was denied.

15. The computer-readable storage medium of claim 8, wherein the login request is determined to be suspicious based on a determination that the login request originates from a geographical location that is greater than a defined distance from a mobile device running the authenticator app.

16. The computer-readable storage medium of claim 8, wherein the login request is determined to be suspicious based on a determination that the login request originates from a geographical location that is new for the username.

17. The computer-readable storage medium of claim 8, wherein the login request is determined to be suspicious based on a risk score generated by a machine learning model that is provided the login context as input.

18. A processing system, comprising:
a processor; and
a computer-readable storage medium having computer-executable instructions stored thereupon that, when executed by the processing system, cause the processing system to:
receive a login request, wherein the login request comprises a username;
determine that the login request is suspicious based on a login context of the login request; and
send an authentication request to an authenticator app that is associated with the username, wherein the authentication request comprises an indication that the login request is deemed suspicious, causing the authenticator app to suppress a push notification for the authentication request while making the authentication request available to be activated manually from within the authenticator app.

19. The processing system of claim 18, wherein the authenticator app receives a manual request to view a list of pending authentication requests, and the authenticator app displays a list of pending authentication requests that includes the authentication request, and wherein the entry in the list of pending authentication requests associated with the authentication request is displayed with an indication that the login request has been deemed suspicious.

20. The processing system of claim 19, wherein the authenticator app receives a user selection of the authentication request, causing the authenticator app to indicate to a server computing device to allow the login request to succeed.

* * * * *